United States Patent [19]

Shimizu et al.

[11] 4,241,638
[45] Dec. 30, 1980

[54] SELF-EXTRUDING FASTENER

[75] Inventors: Mituo Shimizu; Hidenori Miyake, both of Kyoto, Japan

[73] Assignee: Kabushiki Kaisha Yamashina Seikosho, Japan

[21] Appl. No.: 14,919

[22] Filed: Feb. 26, 1979

Related U.S. Application Data

[63] Continuation of Ser. No. 806,450, Jun. 14, 1977, abandoned.

[30] Foreign Application Priority Data

Feb. 23, 1977 [JP] Japan .................................. 52-18048

[51] Int. Cl.³ ........................................... F16B 25/00
[52] U.S. Cl. ..................................................... 85/46
[58] Field of Search ...................... 85/46, 48, 41, 44; 10/10 R

[56] References Cited

U.S. PATENT DOCUMENTS

| | | | |
|---|---|---|---|
| 1,749,903 | 3/1930 | Cannon | 85/46 UX |
| 1,802,668 | 4/1931 | Newton | 85/44 X |
| 2,314,391 | 3/1943 | DeVellier | 85/46 X |
| 3,277,769 | 10/1966 | Lippmeier | 85/44 |
| 3,541,918 | 11/1970 | Johnson | 85/46 |
| 3,942,405 | 3/1976 | Wagner | 85/46 |
| 4,027,573 | 6/1977 | Laverty | 85/46 |

Primary Examiner—Ramon S. Britts
Attorney, Agent, or Firm—Alan Swabey; Robert E. Mitchell; Guy J. Houle

[57] ABSTRACT

A self-extruding fastener having a head provided with a cross groove, a stem having two screw threads and a tapering portion terminating at a sharp pointed forward end adapted to form a guide opening in a thin sheet of metal. A third screw thread generates in a position midway between said two screw threads and in a portion where the stem ends and the tapering portion begins, and extends to the pointed forward end, while the two screw threads disappear in the tapering portion. Therefore, the self-extruding fastener according to the invention comprises three sections, that is, two screw thread section, three screw thread section and one screw thread section.

3 Claims, 9 Drawing Figures

SELF-EXTRUDING FASTENER

This is a continuation of application Ser. No. 806,450 filed June 14, 1977, now abandoned.

BACKGROUND OF THE INVENTION

This invention relates to self-extruding fasteners comprising a head provided with means for engaging a rotary tool, a main body formed on its outer surface with two screw threads of the same outside diameter, root diameter and pitch, and a tapering portion disposed opposite the head with respect to the main body and terminating at a sharp pointed forward end.

Self-extruding fasteners of this type have particular utility in fastening two members together, that is, in securing a member, such as a plasterboard, to another member made of a thin sheet of metal, such as a metal stud used as a framework for producing a wall or a ceiling by a dry process. Generally, self-extruding fasteners used for this purpose are required to be able to perform the following functions in an instant in a single operation:

(1) Forming a guide opening in a thin sheet of metal which is one member to which another member is to be fastened;

(2) Extruding forwardly the material of the thin sheet of metal so as to enlarge the guide opening into a cylindrical bore formed in a projection;

(3) Forming an internally threaded portion on the wall of the cylindrical bore formed in this way; and (4) Clamping the member to be secured to the thin sheet of metal and holding the same in place.

This invention has as its object the provision of a self-extruding fastener comprising a head, a main body and a tapering portion, wherein screw threads of a shape best serving the purpose of performing the aforesaid four different functions are formed on its outer surface.

The aforementioned object of the invention is accomplished by forming on the fastener two screw threads which essentially extend only on the main body, such screw threads having a height which is gradually reduced in a portion where the main body ends and the tapering portion begins, until the two screw threads disappear from the fastener, with a third screw thread being generated in a position midway between the two screw threads and in the portion where the main body ends and the tapering portion begins, the third screw thread gradually increasing its height and extending to a pointed forward end of the tapering portion. In this type of self-extruding fastener, the third screw thread advantageously has its outside diameter and root diameter reduced while having its lead angle increased, as it draws near the pointed forward end of the tapering portion.

BRIEF DESCRIPTION OF THE DRAWINGS

A preferred embodiment of the invention will be described with reference to the accompanying drawings, in which.

DESCRIPTION OF A PREFERRED EMBODIMENT

Figure 1:
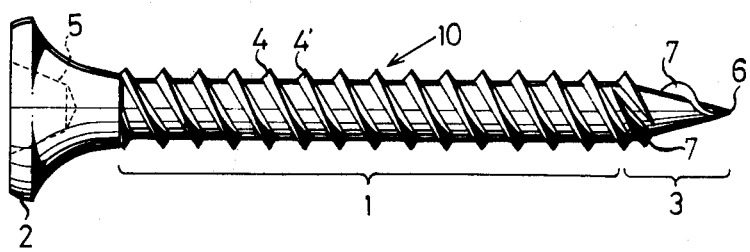
FIG. 1 is a front view of the self-extruding fastener comprising a preferred embodiment of the invention.
Figure 2:
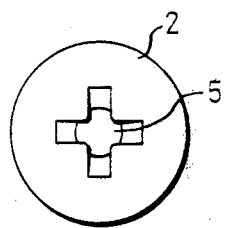
FIG. 2 is an end view of the fastener shown in FIG. 1, showing its head.

In FIG. 1 and FIG. 2, a self-extruding fastener 10 comprises a stem 1 which is a main body having formed on its outer surface two screw threads 4 and 4' of the same outside diameter, root diameter and pitch extending essentially through its entire length, a head 2 contiguous with the stem 1 at one end thereof, and a tapering portion 3 contiguous with the stem 2 and disposed opposite the head 2 with respect to the stem 1. The head 2 is provided with a rotary tool engaging means 5 which in this case is a groove in the form of a cross. The tapering portion 3 has its diameter gradually reduced in going toward its forward end until it terminates at a sharp pointed forward end 6.

Figure 3:
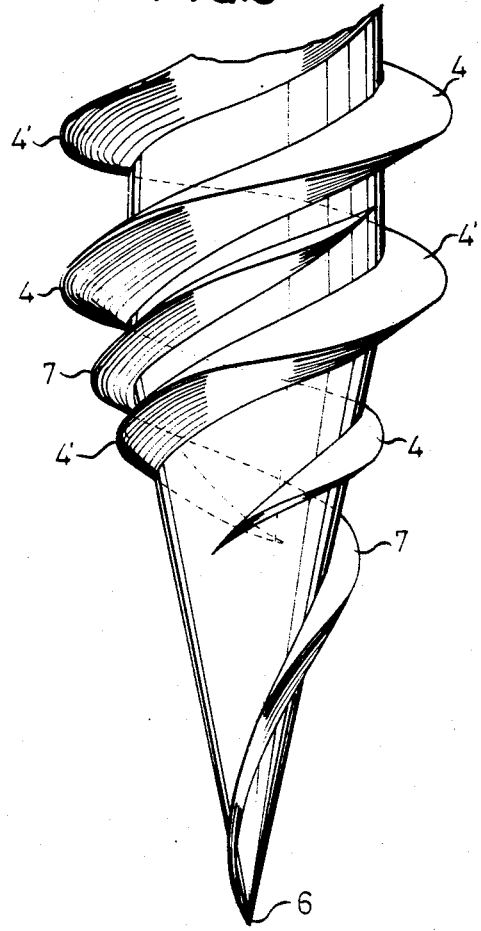
FIG. 3 is a front view on an enlarged scale, showing the essential portions of the self-extruding fastener according to the invention.

As shown clearly in FIG. 3, the two screw threads 4 and 4' have their height gradually reduced by starting at the point at which the stem 1 ends and the tapering portion 3 begins, until they finally disappear from the fastener 10. At the same time, a third screw thread 7 is generated in a position midway between the two screw threads 4 and 4' and extends toward the pointed forward end 6 by having its height gradually increased in going toward the pointed forward end 6. However, the height of the third screw thread 7 is reduced as it reaches the pointed forward end 6, and the third screw thread 7 terminates at the pointed forward end 6. Although the third screw thread 7 is substantially parallel to the two screw threads 4 and 4', its outside diameter and root diameter are reduced and its lead angle is naturally increased as it draws near the pointed forward end 6.

In the self-extruding fastener conforming to the present invention, the main body or stem 1 has two screw threads 4 and 4', the point at which the stem ends and the tapering portion 3 begins has three screw threads including the terminating portions of the two screw threads 4 and 4' and the rise portion of the third screw thread 7, and the forward end portion of the tapering portion has only the third screw thread 7.

Figure 4:
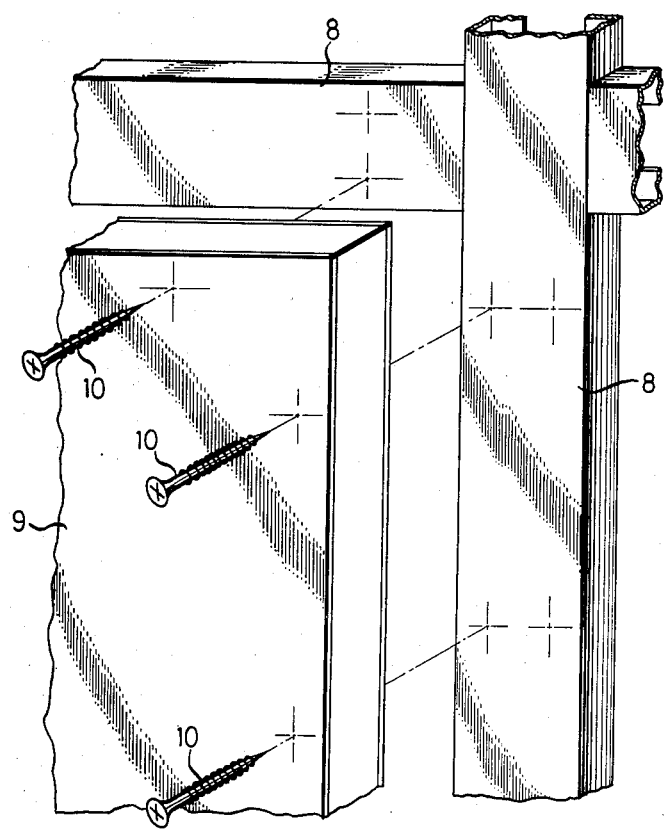
FIG. 4 is an exploded perspective view of a metal stud plasterboard assembly showing the manner in which the self-extruding fastener according to the invention is used.

The functions of the self-extruding fastener according to the invention will now be described for purposes of illumination only, but not by way of limiting the invention thereto, with regard to the case in which a metal stud 8 made of a thin sheet of metal and a plasterboard 9 are fastened together as shown in FIG. 4.

Figure 5:
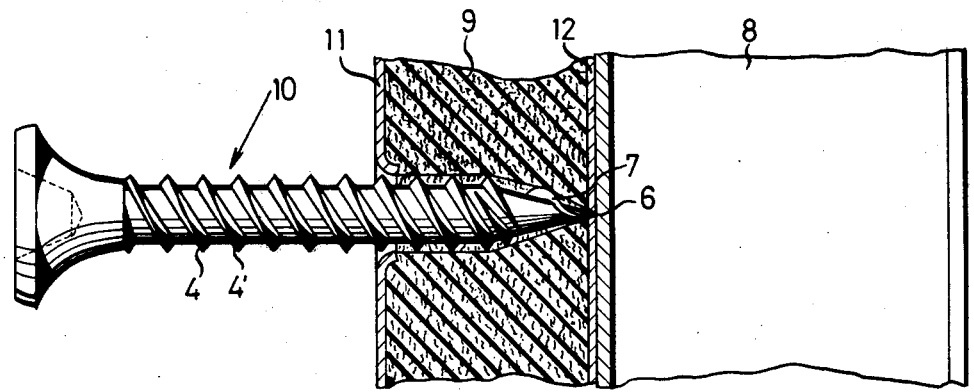
FIG. 5 to FIG. 9 are sectional views showing different stages of a fastening operation in which the fastener according to the invention is used.
Figure 6:
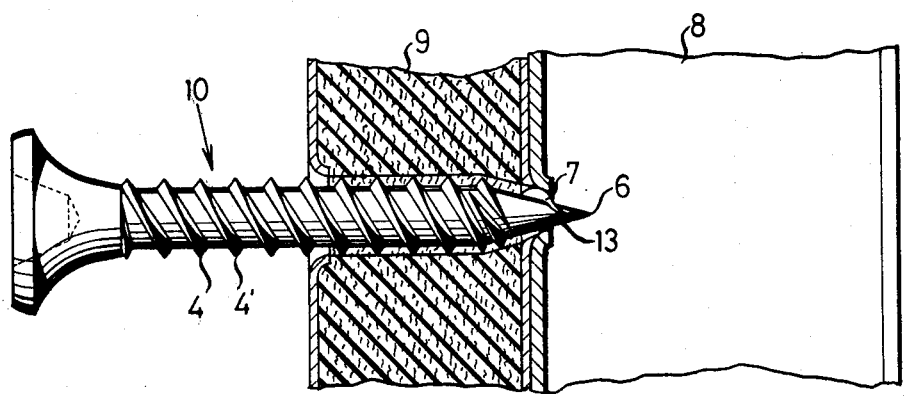

Referring to FIG. 5, the self-extruding fastener 10 is threadably inserted into the plasterboard 9 by driving the same by means of an electric screwdriver, not shown. The numerals 11 and 12 designate front and rear protective paper layers respectively of the plasterboard 9. The fastener 10 readily penetrates the plasterboard 9, which is made of relatively soft material, and is brought to a position shown in the figure in which the pointed forward end 6 abuts against the surface of the metal stud 8 and is kept from entering the metal stud 8. If the operation of the screwdriver is continued to further apply suitable thrust, the pointed forward end 6 of the fastener 10 penetrates the metal stud 8, and a guide opening 13 is formed in the metal stud 8 as shown in FIG. 6. At this stage, it is necessary that the pointed forward end 6 of the fastener 10 penetrates the metal stud 8 in a short time with as little thrust as possible. It has been ascertained as the results of experiments conducted by us that a conical body having a sharp pointed forward end and formed on its outer surface with a screw thread of a large lead angle best serves this purpose.

Figure 7:
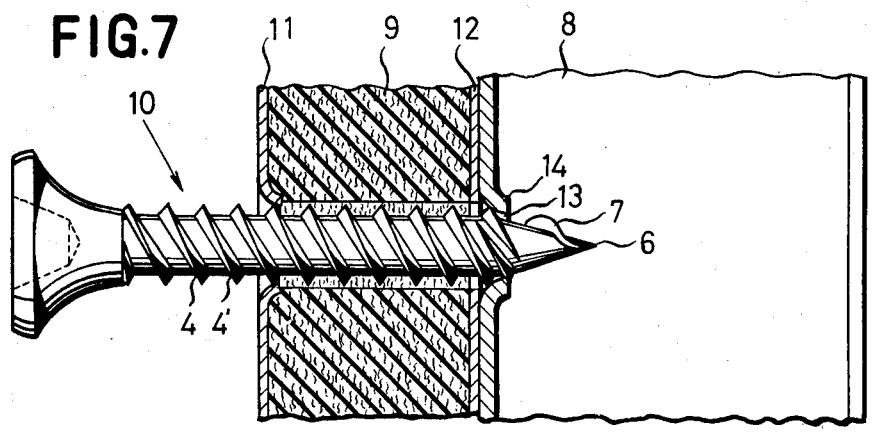
Figure 8:
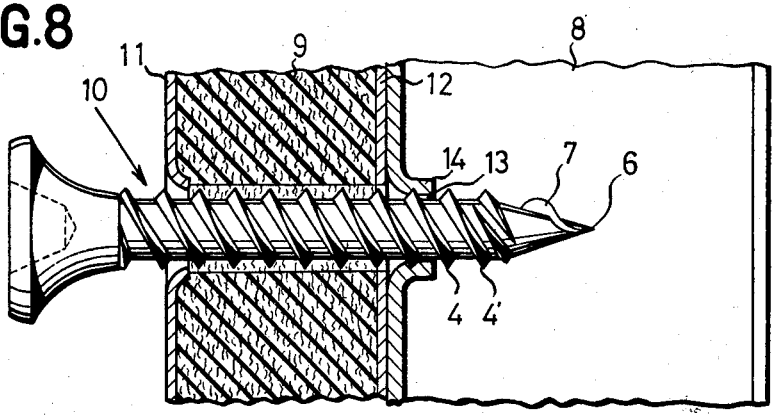
Figure 9:
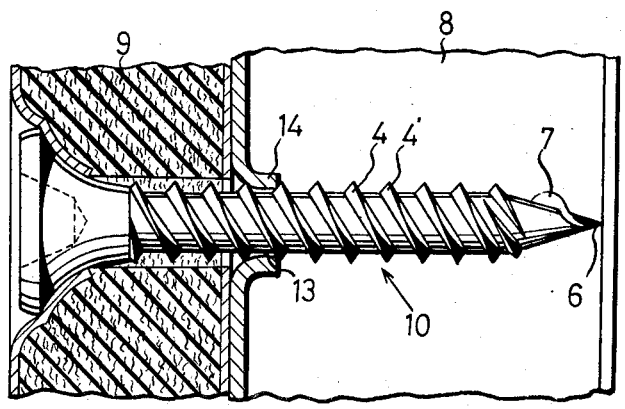

When the size of the guide opening 13 has grown to a suitable level, the fastener 10 forwardly extrudes the material of the metal stud 8 so as to enlarge the guide opening 13 into a cylindrical bore as shown in FIG. 7. At this stage of the operation, the three screw thread portion of the fastener 10 in which the two screw threads 4 and 4' and the third screw thread 7 exist side by side is brought into contact with the guide opening 13 in a stable manner because the fastener 10 engages the guide opening 13 at three points. This enables a uniform pressure to be applied to the circumference of the guide opening 13, with the result that a projection 14 of a suitable shape having the cylindrical bore formed therein is formed. In self-extruding fasteners, the shape, size and dimensional stability of the guide opening 13 are important factors in facilitating the use of the fasteners and exert great influences on the efficiency with which a fastening operation is performed and the holding force exerted by the fasteners on the fastened members after the fastening operation has been completed. The self-extruding fastener according to the invention is capable of forming at all times the projection 14 of a uniform height which is formed with the cylindrical bore and which best serves the purpose of using the fastener of this type.

The cylindrical guide bore formed in this way is formed on the wall with an internally threaded portion as shown in FIG. 6. At this stage of the operation, it is essential that screwing is performed quickly with a low screening torque. It is generally known that the fastener having two screw threads is useful in accomplishing this object. In the fastener according to the invention, the three screw thread portion has passed through the guide opening 13 and the two screw thread portion is in engagement with the guide opening 13.

It is known that, in the final stage of fastening the two members together, the two screw thread portion exhibits a very high holding force.

When a fastening operation is performed by using a self-extruding fastener, a series of operation stages shown in FIG. 5 to FIG. 9 are followed in an instant without any interval between the stages. The fastener according to the invention is constructed such that is has a screw thread configuration which best serves the purpose of performing the following steps to cope with these operation stages:

(1) Penetration of the thin sheet of metal to form the guide opening is accomplished by means of the sharp pointed forward end and the single screw thread of a large lead angle;

(2) Formation of the cylindrical projection having the cylindrical bore is accomplished by means of the three screw threads; and (3) Formation of the internally threaded portion on the wall of the cylindrical bore and clamping of one member to the other member are accomplished by the two screw threads.

The invention is capable of improving efficiency in performing a fastening operation and increasing the holding force exerted by the fastener after the two members have been fastened together.

In addition, the production of the self-extruding fastener according to the invention involves no increase in cost as compared with the fasteners of the prior art, because the screw threads of the self-extruding fastener can be formed in a single operation by using a pair of rolling tools.

What we claim is:

1. An integral self-extruding screw, comprising,
    a cylindrical shank having at one end means for engaging a rotary driving tool and the other merging into a substantially straight tapering tip ending in a point,
    the shank having formed on its outer surface a pair of spaced-apart tapping screw threads of the same outside diameter, root diameter and tapping pitch and defining a two thread zone,
    each tapping screw thread continuing from the shank for a minor part of the length of the tip with its height gradually reducing just beyond the zone of merger of the shank and tip until both screw threads disappear at substantially opposed places on said tip,
    a single opening forming and enlarging thread being generated in a position midway between said tapping threads substantially within said merger zone of the shank and tip to form a three thread zone and continuing on said tip to the point to form a single thread zone,
    said opening forming and enlarging thread first having a tapping pitch the same as that of said tapping threads while it intervenes said tapping threads for a minor part of the length of the tip and gradually increasing in height and then as it extends beyond said tapping threads having its height and its root diameter reduced and its lead angle greatly increased as it nears the point whereby it has an opening forming and enlarging pitch for a major part of the length of the tip,
    said single thread zone together with said tip point defining means for forming a guide opening in sheet metal, said three thread zone forming means for extruding sheet metal to form an extruded cylindrical bore, and said two thread zone forming means for internally threading a just previously formed extruded cylindrical bore.

2. An integral self-extruding screw, as defined in claim 1, in which the opening forming and enlarging thread describes less than a single turn from level with the positions where the tapping threads disappear till it reaches the point.

3. An integral self-extruding screw, comprising,
    a cylindrical shank having at one end means for engaging a rotary driving tool and the other end merging into a substantially straight tapering tip ending in a point,
    the shank having formed on its outer surface a pair of spaced apart tapping screw threads of a selected outside diameter, root diameter and tapping pitch,
    each of said tapping screw threads continuing from the shank for at least a minor part of the length of the tip with its height gradually reducing beyond the zone of merger of the shank and tip until said screw thread disappears on said tip,
    a single opening forming and enlarging thread generated in a position substantially within said merger zone of the shank and tip and continuing on said tip to the point, said opening forming and enlarging thread first having a tapping pitch the same as that of said tapping threads for a minor part of the length of the tip and then gradually increasing in height and then having its height and its root diameter reduced and its lead angle greatly increased as it nears the point whereby it has an opening enlarging pitch for a major part of the length of the tip, said opening forming and enlarging thread being axially offset relative to said tapping threads and axially overlapping at least one of said tapping threads and having a maximum outside diameter less than that of adjacent portions of said one tapping thread.

* * * * *